United States Patent [19]
Kleine et al.

[11] Patent Number: 4,884,710
[45] Date of Patent: Dec. 5, 1989

[54] HOUSING FOR A CHIP CARD READER

[75] Inventors: Peter Kleine, Fischen; Klaus Wechsler, Puchheim, both of Fed. Rep. of Germany

[73] Assignee: Siemens Aktiengesellschaft, Berlin and Munich, Fed. Rep. of Germany

[21] Appl. No.: 242,214

[22] Filed: Sep. 9, 1988

[30] Foreign Application Priority Data

Sep. 11, 1987 [DE] Fed. Rep. of Germany ... 8712368[U]

[51] Int. Cl.$^4$ .............................................. B65D 6/00
[52] U.S. Cl. .................................... 220/4 R; 220/444
[58] Field of Search ....................... 206/444; 220/4 R

[56] References Cited
U.S. PATENT DOCUMENTS 4,519,893  5/1985  Olas ..................................... 206/444
4,627,531  12/1986  Clemens .............................. 206/444
4,802,601  2/1989  Pijanowski et al. ................ 220/4 R Primary Examiner—A. Michael Chambers
Attorney, Agent, or Firm—Hill, Van Santen, Steadman & Simpson

[57] ABSTRACT

A housing for chip card reader constructed such that is can be assembled without the assistance of tools. The housing is composed of a base, a cover that can be slipped onto said base, and a cap that joins said base to said cover. These parts of the housing are merely plugged together and are secured to one another in the assembled condition of the parts without external fasteners.

6 Claims, 1 Drawing Sheet

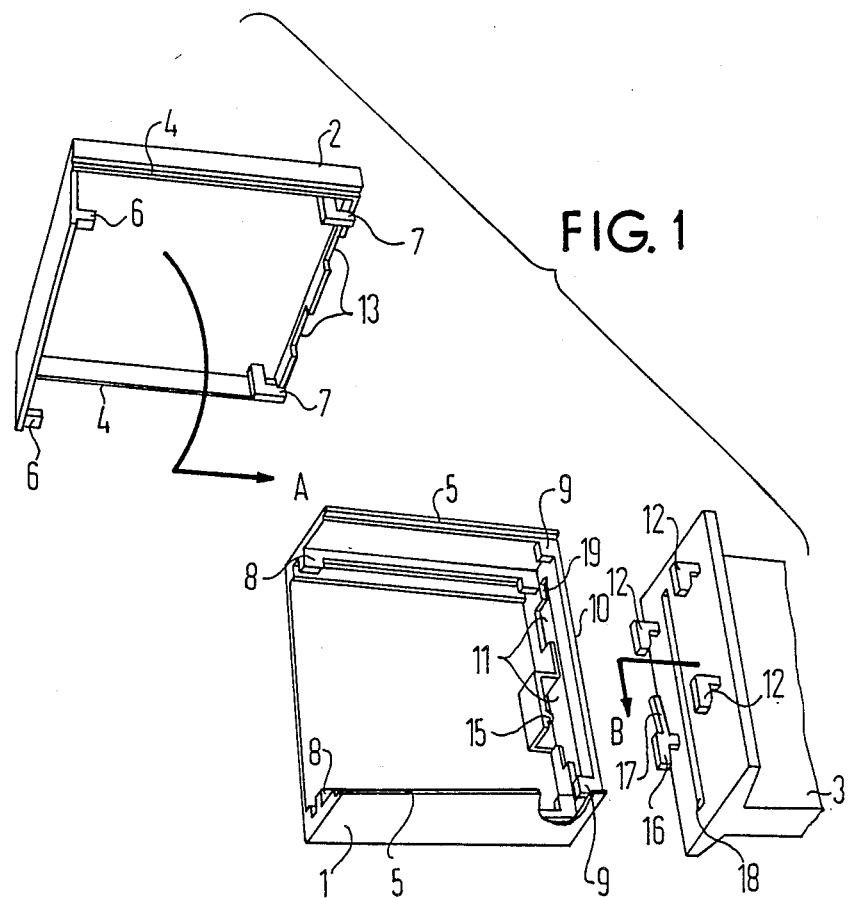

HOUSING FOR A CHIP CARD READER

BACKGROUND OF THE INVENTION

1. Field of the Invention

The present invention is directed to a housing for a chip card reader, and in particular to a housing constructed of a plurality of parts which can be quickly and simply assembled without the assistance of special tools or additional fasteners such as screws or rivets.

2. Description of the Prior Art

Housings of chip card readers are usually composed of a plurality of discrete parts that, for example, are joined to one another with screws.

SUMMARY OF THE INVENTION

It is the object of the present invention to construct a housing composed of a plurality of parts such that it can be quickly and simply assembled without the assistance of special tools or additional fasteners such as screws or rivets.

The above object is achieved in accordance with the principles of the present invention in a chip card reader housing having a base, a cover insertable onto the base, and a cap joining these two parts, whereby the said housing parts can be plugged together and are secured to one another in the assembled condition. Given such a structure of the housing, assembly can also ensue in an automatic manufacturing unit. This considerably reduces the manufacturing costs. In this case, with respect to their connection the individual parts can be designed such that the automatic unit need only execute manufacturing steps that proceed horizontally or vertically relative thereto.

Webs and hook-shaped projections can thereby be provided at the cover. These webs and hook-like projections interact with abutments arranged at the base, whereas the cap has safety hooks that engage through clearances arranged at the cover and at the base. In this case, a final securing of the housing parts ensues in that one of the safety hooks has an elastically deformable tongue that engages behind a nose in latching fashion in the ultimate position of the housing part. This nose is located at a shaft-like receptacle that is open at one side.

DESCRIPTION OF THE DRAWINGS

FIG. 1 is an exploded view of the individual parts of the housing for a card reader constructed in accordance with the principles of the present invention.

DESCRIPTION OF THE PREFERRED EMBODIMENTS

As shown in FIG. 1, a housing for a card reader has a base 1, a cover 2 placeable on this base 1, and a cap 3 joining these two parts.

The cover 2 is slipped onto the base 1 in a first step (arrow direction A). The edge regions 4 of the cover 2 thereby lie on the edge region 5 of the base 1 that is stepped. Webs 6 and a hook-shaped projections 7 at the cover 2 engage behind corresponding abutments 8 and 9 provided at the base. This engagement in the final position of these two parts 1 and 2 secures the cover at the base perpendicularly relative to its slip-on direction.

Respective clearances 11 and 13 in the cover 2 and the base 1 in combination form openings having a rectangular cross section at a face end 10 of the assembled cover 2 and base 1. These clearances 11 and 13 are penetrated by safety hooks 12 on the cap 3. By displacing the cap 3 in arrow direction B, base 1 and cover 2 are secured such that they can no longer separate, even opposite the slip-on direction of the cover 2. A shaft-like receptacle 14 that is open at one side is also provided in the base. This receptacle 14 has a nose 15 at its wall facing toward the face end. The safety hook 16 arranged at the cap 3 has an elastically deformable tongue 17. In the slipped-on condition of the cap 3, this tongue 10 engages behind the nose 15 at the receptacle, so that the cap 3 is also secured opposite its plug-on direction. As may be seen from FIG. 1, both the cap 3 and the housing part formed of the base 1 and the cover 2 have respective slots 18 and 19 for the acceptance of a chip card.

Although modifications and changes may be suggested by those skilled in the art it is the intention of the inventors to embody within the patent warranted hereon all changes and modifications as reasonably and properly come within the scope of their contribution to the art.

We claim as our invention:

1. A housing for a chip card reader comprising:
   a base;
   a cover for said base;
   a cap for holding said base and said cover together engaged with said cap; and
   means integrally formed on each of said base, cover and cap and for interconnecting said base, cover and cap and for retaining said base, cover and cap in interconnected relation, said means being the sole means for interconnecting said base, cover and cap, said means for interconnecting including a plurality of respective recesses in said cover and in said base disposed in registry to form in combination a wall having a plurality of openings when said cover and base are engaged, a plurality of hooks on said cap received in said openings and simultaneously engaging said cover and said base, a deformable noise carried on at least one of said hooks, a receptacle disposed at said wall adjacent one of said openings to receive said noise, and a projection on said receptacle disposed to abut said noise in said receptacle to prevent said noise from exiting said receptacle.

2. A housing as claimed in claim 1, wherein said means for interconnecting further includes:
   respective complementary surfaces on said cover and said base permitting said cover to slide on said base to a position substantially closing said base;
   a base having a plurality of receptacles therein; and
   a plurality of hooks integrally formed on said cover disposed to be respectively received in said receptacles when said cover is in said position substantially closing said base.

3. A housing for a chip card reader comprising: a cover having a first pair of stepped sliding surfaces,
   a plurality of projections, and a wall having a plurality of recesses therein;
   a base having a second pair of stepped sliding surfaces complementary to said first pair of sliding surfaces, a plurality of receptacles, and a wall having a plurality of recesses therein, said cover and said base being engageable along said first and second pairs of sliding surfaces to slide said cover over said base to a final position, said receptacles of said base in said final receiving said projections of said cover in said final position, and said walls of said cover and said base being in registry in said final position; and a cap having a plurality of hooks thereon, said hooks being received in said recesses of said base and said cover in said final position with said cap abutting said walls of said base and cover.

4. A housing as claimed in claim 3 further comprising:
a deformable nose carried on at least one of said hooks;
a receptacle on said wall of said base adjacent one of said recesses disposed to receive said nose when said one of said hooks is received in said one of said receptacles; and
a projection on said receptacle abutting said nose received in said receptacle to prevent said nose from exioting said receptacle.

5. A housing for a chip card reader comprising:
a cover having an end wall;
a base having an end wall;
means integrally formed on said cover and said base for slidably engaging said base and said cover in a sliding direction perpendicular to said end walls to bring said end walls into registry in a final position of said cover, said means for slidably engaging including means for preventing movement of said cover in a direction perpendicular to said end walls and said sliding direction;
means integrally formed on said cover and said base engaging said cover with said base for preventing movement of said cover in said final position in a direction parallel to said end walls;
a cap abutting both said end walls when said cover is in said final position; and
means integrally formed on said cap, said cover and said base for holding said cap against said end walls and for preventing movement of said cover in a direction opposite to said sliding direction when said cover is in said final position.

6. A housing as claimed in claim 5, wherein said means for holding said cap against said end walls is a means for slidably engaging said cap with said end walls in a further sliding direction perpendicular to said sliding direction to bring said cap to a final position, and wherein said housing further comprises:
means for preventing movement of said cap in said final position in a direction opposite to said further sliding direction.

* * * * *